(12) United States Patent
Wang et al.

(10) Patent No.: US 11,575,193 B2
(45) Date of Patent: Feb. 7, 2023

(54) ELECTRONIC DEVICE WITH SLOT ANTENNA

(71) Applicant: Huawei Technologies Co., Ltd., Shenzhen (CN)

(72) Inventors: Yuhui Wang, Wuhan (CN); Kemeng Wang, Wuhan (CN); Chungwen Yang, Dongguan (CN); He Xiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 125 days.

(21) Appl. No.: 17/050,559

(22) PCT Filed: Apr. 28, 2018

(86) PCT No.: PCT/CN2018/085036
§ 371 (c)(1),
(2) Date: Oct. 26, 2020

(87) PCT Pub. No.: WO2019/205120
PCT Pub. Date: Oct. 31, 2019

(65) Prior Publication Data
US 2021/0242567 A1    Aug. 5, 2021

(51) Int. Cl.
*H01Q 1/22* (2006.01)
*H01Q 1/24* (2006.01)
*H01Q 1/48* (2006.01)
*H01Q 13/16* (2006.01)
*G06F 3/02* (2006.01)
*G06F 3/0354* (2013.01)

(52) U.S. Cl.
CPC .......... *H01Q 1/2266* (2013.01); *G06F 3/0202* (2013.01); *G06F 3/03547* (2013.01); *H01Q 1/245* (2013.01); *H01Q 1/48* (2013.01); *H01Q 13/16* (2013.01)

(58) Field of Classification Search
CPC ........ H01Q 1/2266; H01Q 1/245; H01Q 1/48; H01Q 13/16; H01Q 13/103; G06F 3/0202; G06F 3/03547
See application file for complete search history.

(56) References Cited

U.S. PATENT DOCUMENTS

| 9,450,288 B2 | 9/2016 | Ruan et al. | |
|---|---|---|---|
| 2003/0122721 A1* | 7/2003 | Sievenpiper | H01Q 13/103 343/768 |
| 2005/0146475 A1 | 7/2005 | Bettner et al. | |
| 2009/0256757 A1 | 10/2009 | Chiang et al. | |
| 2010/0090911 A1 | 4/2010 | Adachi | |

(Continued)

FOREIGN PATENT DOCUMENTS

| CN | 202352829 U | 7/2012 |
|---|---|---|
| CN | 103840251 A | 6/2014 |

(Continued)

*Primary Examiner* — Dimary S Lopez Cruz
*Assistant Examiner* — Michael M Bouizza
(74) *Attorney, Agent, or Firm* — Conley Rose, P.C.

(57) ABSTRACT

An electronic device with a slot antenna comprises a surface C, which includes a keyboard area for inputting using a keyboard, a touch area for inputting using a touchpad, and a palm rest. The palm rest is made of a metal material, and a radiating slot is disposed in the palm rest to form the slot antenna.

18 Claims, 5 Drawing Sheets

(56) References Cited

U.S. PATENT DOCUMENTS

| | | |
|---|---|---|
| 2010/0120379 A1 | 5/2010 | Fukagawa et al. |
| 2011/0045881 A1 | 2/2011 | Lo et al. |
| 2012/0133565 A1 | 5/2012 | Konanur et al. |
| 2013/0342425 A1 | 12/2013 | Wong et al. |
| 2014/0184450 A1 | 7/2014 | Koo et al. |
| 2016/0190690 A1 | 6/2016 | Badran et al. |
| 2017/0365930 A1 | 12/2017 | Nishioka |
| 2018/0083344 A1* | 3/2018 | Han ................ H01Q 1/243 |

FOREIGN PATENT DOCUMENTS

| | | | |
|---|---|---|---|
| CN | 103915690 A | 7/2014 | |
| CN | 204991944 U | 1/2016 | |
| CN | 105680153 A | 6/2016 | |
| CN | 105720381 A | 6/2016 | |
| CN | 106099327 A * | 11/2016 | ............ H01Q 1/36 |
| CN | 107548145 A | 1/2018 | |
| JP | 2003152430 A | 5/2003 | |
| JP | 2003234615 A | 8/2003 | |

* cited by examiner

ELECTRONIC DEVICE WITH SLOT ANTENNA

CROSS-REFERENCE TO RELATED APPLICATIONS

This application is a U.S. National Stage of International Patent Application No. PCT/CN2018/085036 filed on Apr. 28, 2018, which is hereby incorporated by reference in its entirety.

TECHNICAL FIELD

This application relates to the field of electronic devices, and more specifically, to an electronic device with a slot antenna.

BACKGROUND

Currently, a mainstream wireless communication manner of a notebook computer is communication based on a wireless-fidelity (Wireless-Fidelity, Wi-Fi) network. With reduction of network tariffs of an $N^{th}$ generation mobile communications (for example, 2G, 3G, 4G, and 5G), a requirement for a notebook computer to perform wireless communication by using the $N^{th}$ generation mobile communications, and in particular, by using the 4G mobile communications is increasingly strong. The 4G mobile communications is mainly based on a long term evolution (Long Term Evolution, LTE) technology. In an existing solution, an LTE antenna in the notebook computer is usually located at a top or a bottom of a display screen. This is unfavorable to a development direction of a full-screen of the notebook computer. In addition, in the existing solution, mobile communication antennas in some notebook computers are disposed between a surface C and a surface D. This is unfavorable to a development direction of a metallic body of the notebook computer.

SUMMARY

This application provides an electronic device with a slot antenna, which can be applied to an ultra-thin and metallic body, and has good antenna performance.

According to a first aspect, an electronic device is provided. A surface C includes a keyboard area used for inputting by using a keyboard, a touch area used for inputting by using a touchpad, and a palm rest. The palm rest is made of a metal material, and at least one radiating slot is disposed in the palm rest, to form a slot antenna.

According to the electronic device provided in the first aspect, the slot antenna is arranged in the palm rest of the surface C of the electronic device, which has little impact on a layout of components in the electronic device. A manufacturing method of the slot antenna is simple, a size of the slot antenna is small, and the slot antenna can implement an ultra-wideband feature. The slot antenna can be applied to an electronic device with an ultra-thin and metallic body, and has strong portability. In addition, there is no need to add a redundant circuit to a radio frequency circuit.

In this application, the slot antenna in the electronic device may be a mobile communication antenna. In this application, there is good isolation between the slot antenna and a Wi-Fi antenna in the electronic device.

In this application, the electronic device may further include a surface A used as a top cover, a surface B with a screen, and a surface D used as a bottom cover. The electronic device may be a notebook computer.

In this application, the palm rest may be one or more areas on the surface C except the keyboard area and the touch area. The electronic device may include a left palm rest and a right palm rest.

In a possible implementation of the first aspect, the at least one radiating slot may include an L-shaped radiating slot. The L-shaped radiating slot is easily arranged in a housing of the electronic device, and a formed operating frequency band of the slot antenna is wide.

In a possible implementation of the first aspect, a first part of the L-shaped radiating slot has a first feeding point and a first grounding point, the first grounding point is closer to a first end of the first part than the first feeding point, and the first grounding point is farther from a second end of the first part than the first feeding point. A second part of the L-shaped radiating slot has a second feeding point and a second grounding point, the second grounding point is closer to a third end of the second part than the second feeding point, the second grounding point is farther from a fourth end of the second part than the second feeding point, and the first end coincides with the third end.

In a possible implementation of the first aspect, the first part is parallel to and close to a long side of the keyboard area, and the second part is perpendicular to the first part and parallel to and close to a side of the touch area. The L-shaped radiating slot is disposed in the palm rest in this possible implementation, and does not affect a layout of other components of the electronic device. This ensures performance of the slot antenna.

In a possible implementation of the first aspect, a length of the first part and a length of the second part are greater than 50 millimeters.

In a possible implementation of the first aspect, a distance between the first feeding point and the second end is greater than 35 millimeters. This possible implementation implements relatively good low-frequency performance.

In a possible implementation of the first aspect, a distance between the second feeding point and the fourth end is greater than or equal to 10 millimeters and less than or equal to 30 millimeters. This possible implementation implements relatively good high-frequency performance.

In a possible implementation of the first aspect, the first grounding point is grounded by using a first capacitor, the second grounding point is grounded by using a second capacitor, the electronic device further includes a specific absorption rate SAR sensor, and at least a part of a metal body of the palm rest is used as a sensor body of the SAR sensor. In this possible implementation, the SAR sensor may be integrated in the electronic device.

In a possible implementation of the first aspect, the sensor body of the SAR sensor is connected to a sensor circuit by using at least one of the first feeding point, the first grounding point, the second feeding point, and the second grounding point.

In a possible implementation of the first aspect, a metal component is arranged in a part covered by the palm rest of the electronic device, and a flat cable of the metal component is connected to a host system by using space between the first grounding point and the second grounding point. This possible implementation does not affect a layout of other components of the electronic device, and performance of the slot antenna can also be ensured.

In a possible implementation of the first aspect, the first feeding point is connected to a first feeding circuit by using a first tunable capacitor. In this possible implementation, an equivalent length between the first grounding point and the first feeding point may be tuned by using the first tunable capacitor, to implement that a frequency band of an antenna is tunable.

In a possible implementation of the first aspect, the second feeding point is connected to a second feeding circuit by using a second tunable capacitor. In this possible implementation, an equivalent length between the second grounding point and the second feeding point may be tuned by using the second tunable capacitor, to implement that a frequency band of an antenna is tunable.

In a possible implementation of the first aspect, there is a first frequency band adjustment point between the first grounding point and the first feeding point, a first selection component is disposed at the first frequency band adjustment point, and the first selection component is configured to select inductance components with different inductance values to connect to metal on two sides of a slot at the first frequency band adjustment point. This possible implementation can implement full-band antenna coverage.

In a possible implementation of the first aspect, there is a second frequency band adjustment point between the second grounding point and the second feeding point, a second selection component is disposed at the second frequency band adjustment point, and the second selection component is configured to select inductance components with different inductance values to connect to metal on two sides of a slot at the second frequency band adjustment point. This possible implementation can implement full-band antenna coverage.

In a possible implementation of the first aspect, an area that is on a surface D of the electronic device and that is opposite to the radiating slot has a window, or the area that is on the surface D of the electronic device and that is opposite to the radiating slot is nonmetallic. This possible implementation can ensure performance of the slot antenna.

In a possible implementation of the first aspect, the palm rest includes a left palm rest and a right palm rest, the slot antenna is separately formed in the left palm rest and the right palm rest, the electronic device further includes a sensor, the sensor is configured to detect whether a palm of a user approaches the left palm rest or the right palm rest, and when the palm of the user approaches only one of the left palm rest and the right palm rest, the electronic device disables operating of a slot antenna in a palm rest that the palm of the user approaches, and keeps operating of a slot antenna in a palm rest that the palm of the user does not approach. This possible implementation helps save power for the electronic device.

According to a second aspect, a slot antenna is provided. A metal radiator of the slot antenna is at least a part of a housing of an electronic device, and the metal radiator includes an L-shaped radiating slot. A first part of the L-shaped radiating slot has a first feeding point and a first grounding point, the first grounding point is closer to a first end of the first part than the first feeding point, and the first grounding point is farther from a second end of the first part than the first feeding point. A second part of the L-shaped radiating slot has a second feeding point and a second grounding point, the second grounding point is closer to a third end of the second part than the second feeding point, the second grounding point is farther from a fourth end of the second part than the second feeding point, and the first end coincides with the third end.

In a possible implementation of the second aspect, a surface C of the electronic device includes a keyboard area used for inputting by using a keyboard, a touch area used for inputting by using a touchpad, and a palm rest. The palm rest is made of a metal material, and the L-shaped radiating slot is located in the palm rest of the electronic device.

In a possible implementation of the second aspect, the first part is parallel to and close to a long side of the keyboard area, and the second part is perpendicular to the first part and parallel to and close to a side of the touch area.

In a possible implementation of the second aspect, a length of the first part and a length of the second part are greater than 50 millimeters.

In a possible implementation of the second aspect, a distance between the first feeding point and the second end is greater than 35 millimeters.

In a possible implementation of the second aspect, a distance between the second feeding point and the fourth end is greater than or equal to 10 millimeters and less than or equal to 30 millimeters.

In a possible implementation of the second aspect, the first grounding point is grounded by using a first capacitor, and the second grounding point is grounded by using a second capacitor.

In a possible implementation of the second aspect, the first feeding point is connected to a first feeding circuit by using a first tunable capacitor.

In a possible implementation of the second aspect, the second feeding point is connected to a second feeding circuit by using a second tunable capacitor.

In a possible implementation of the second aspect, there is a first frequency band adjustment point between the first grounding point and the first feeding point, a first selection component is disposed at the first frequency band adjustment point, and the first selection component is configured to select inductance components with different inductance values to connect to metal on two sides of a slot at the first frequency band adjustment point.

In a possible implementation of the second aspect, there is a second frequency band adjustment point between the second grounding point and the second feeding point, a second selection component is disposed at the second frequency band adjustment point, and the second selection component is configured to select inductance components with different inductance values to connect to metal on two sides of a slot at the second frequency band adjustment point.

In a possible implementation of the second aspect, the slot antenna is a mobile communication antenna.

DESCRIPTION OF EMBODIMENTS

The following describes technical solutions of this application with reference to accompanying drawings.

Figure 1:
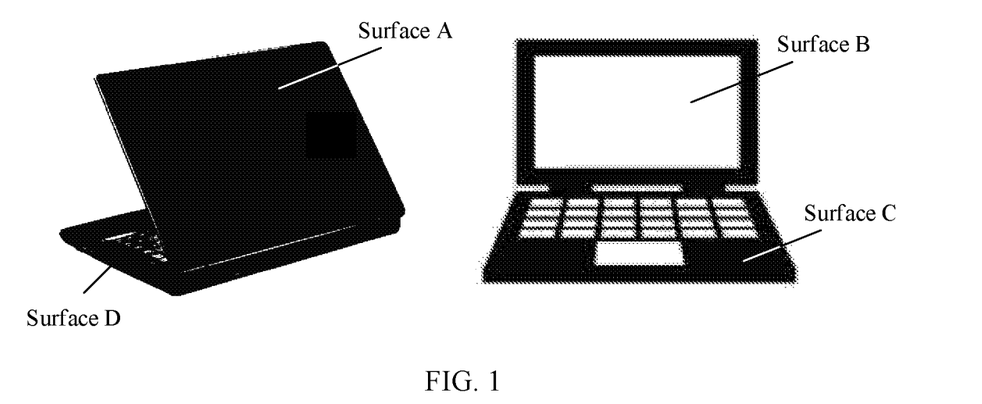
FIG. 1 is a schematic diagram of a basic structure of a notebook computer according to an embodiment of this application.

An electronic device in the embodiments of this application may be a notebook computer. FIG. 1 is a schematic diagram of a basic structure of a notebook computer according to an embodiment of this application. As shown in FIG. 1, surfaces of the notebook computer are a surface A, a surface B, a surface C, and a surface D from top to bottom. The surface A, the surface B, and components between the surface A and the surface B form a display screen. The surface C, the surface D, and components between the surface C and the surface D form a keyboard and a host. The display screen and the keyboard and the host may be connected by using a hinge (hinge).

Figure 2:
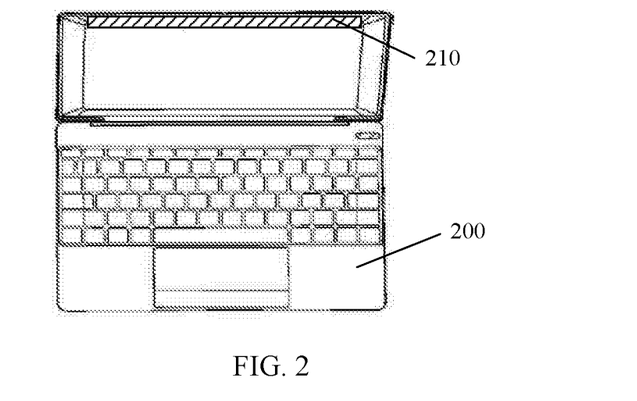
FIG. 2 is a schematic diagram of a layout of an LTE antenna in a notebook computer.

FIG. 2 is a schematic diagram of a layout of an LTE antenna in a notebook computer. As shown in FIG. 2, an LTE antenna 210 is arranged at a top of a display screen of a notebook computer 200. This is currently a most common LTE antenna layout solution. In this solution, a cable length of the LTE antenna is relatively long, and is about 400 mm to 600 mm. Therefore, a cable loss (cable loss) is relatively large. In addition, this solution requires that a component of the surface A is nonmetallic, and a window needs to be opened in the surface B. In this way, clearance of the antenna reaches 13 mm to 20 mm. This is unfavorable to a metalization requirement and a full-screen requirement of a current notebook computer. In addition, as the notebook computer becomes ultra-thin, a thickness of the component of the surface A is usually less than 4 mm, and edge arcing processing is performed on the component of the surface A. Therefore, a conventional adjustable technical solution cannot be used to compress antenna space and implement a full-band antenna.

Figure 3:
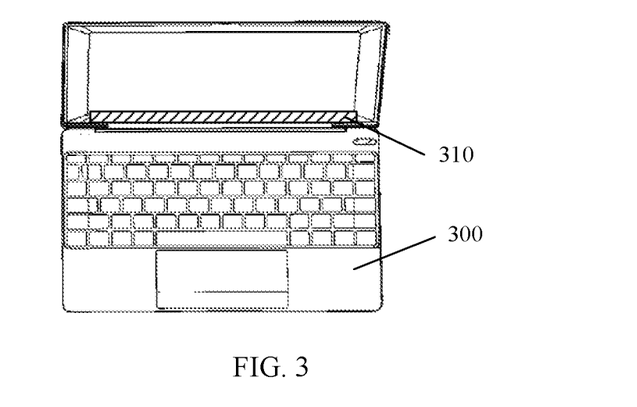
FIG. 3 is a schematic diagram of another layout of an LTE antenna in a notebook computer.

FIG. 3 is a schematic diagram of another layout of an LTE antenna in a notebook computer. As shown in FIG. 3, an LTE antenna 310 is arranged in a hinge cover at a bottom of a display screen of a notebook computer 300. In this solution, most LTE antennas are inverted F antennas (Inverted F Antenna, IFA). This solution requires that the hinge cover is nonmetallic, and a window is opened at a lower part of the surface B. This is unfavorable to a metalization requirement and a full-screen requirement of a current notebook computer. In addition, if a component of the surface C and/or a component of the surface D are/is metallic in this solution, low-frequency isolation between main and diversity antennas of the LTE antenna is very poor. In addition, mutual interference is generated between the LTE antenna 310 and a Wi-Fi antenna.

Figure 4:
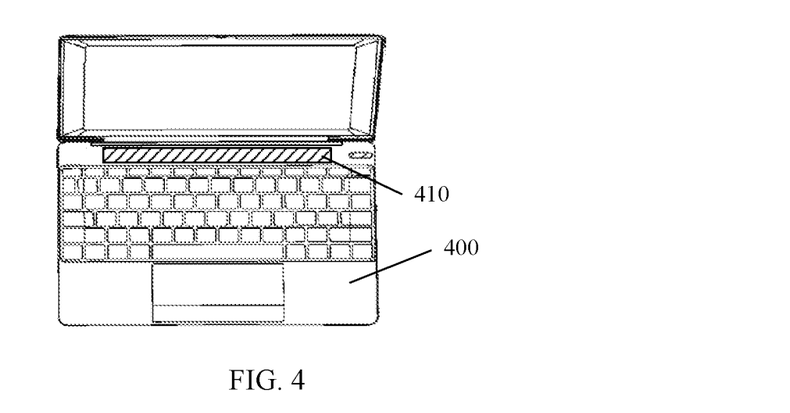
FIG. 4 is a schematic diagram of still another layout of an LTE antenna in a notebook computer.

FIG. 4 is a schematic diagram of still another layout of an LTE antenna in a notebook computer. As shown in FIG. 4, an LTE antenna 410 is arranged between a surface C and a surface D of a notebook computer 400, and a position of the LTE antenna 410 corresponds to a hinge cover. In this solution, low-frequency isolation between main and diversity antennas of the LTE antenna is poor, and mutual interference is generated between the LTE antenna 410 and a Wi-Fi antenna. In addition, the LTE antenna 410 is adjacent to a host system, and a risk of interference between the LTE antenna 410 and the host system is relatively high.

To sum up, the notebook computer has the following restrictions on a mobile communication antenna due to its own features: Metallic bodies of the surface A, the surface C, and the surface D restrict a design of the mobile communication antenna. A full-screen trend and ultra-thin components of the surface A and the surface B make it impossible to deploy the mobile communication antenna in the surface A and the surface B. A large amount of manpower and material resources need to be invested for migrating an existing mobile communication antenna solution in a mobile phone and a tablet computer to the notebook computer.

To resolve the foregoing problem, an embodiment of this application provides a mobile communication antenna solution that can meet requirements of a full-screen and a metallic body of the notebook computer. An antenna in this embodiment of this application may be applied to an electronic device such as a notebook computer, a portable computer, a mobile phone, or a tablet computer. However, this embodiment of this application is not limited thereto. The following mainly uses the notebook computer as an example for detailed description.

It should be understood that an electronic device in the embodiments of this application may include but is not limited to a notebook computer, a portable computer, a mobile phone, a tablet computer, or the like. A slot antenna in the embodiments of this application may be disposed at a position such as a palm rest, a side edge, a side corner, a rear cover, an upper cover, or a lower cover of an electronic device such as a notebook computer, a portable computer, a mobile phone, or a tablet computer.

An embodiment of this application provides an electronic device. A surface C of the electronic device includes a keyboard area used for inputting by using a keyboard, a touch area used for inputting by using a touchpad, and a palm rest. The palm rest is made of a metal material, and at least one radiating slot is disposed in the palm rest, to form a slot antenna.

In the electronic device in this embodiment of this application, the slot antenna is arranged in the palm rest of the surface C of the electronic device, which has little impact on a layout of components in the electronic device. A manufacturing method of the slot antenna is simple, a size of the slot antenna is small, and the slot antenna can implement an ultra-wideband feature. The slot antenna can be applied to an electronic device with an ultra-thin and metallic body, and has strong portability. In addition, there is no need to add a redundant circuit to a radio frequency circuit.

It should be understood that, in the embodiments of this application, the palm rest may be one or more areas on the surface C except the keyboard area and the touch area.

It should be further understood that, in the embodiments of this application, the electronic device may further include a surface A used as a top cover, a surface B with a screen, and a surface D used as a bottom cover.

From another perspective, an embodiment of this application provides a slot antenna. A metal radiator of the slot antenna is at least a part (for example, a part of the palm rest of the surface C) of a housing of the electronic device. The metal radiator may include a radiating slot, and the radiating slot has at least one pair of a grounding point and a feeding point.

Figure 5:
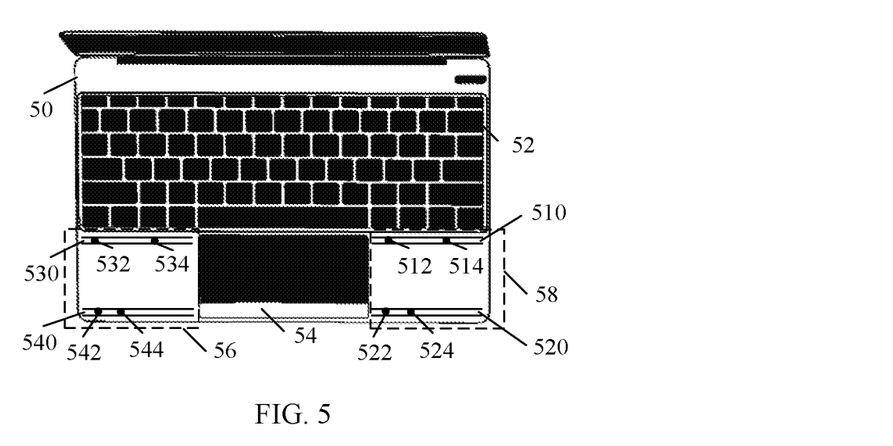
FIG. 5 is a schematic structural diagram of an electronic device and a slot antenna according to an embodiment of this application.

FIG. 5 is a schematic structural diagram of an electronic device 50 and a slot antenna according to an embodiment of this application. As shown in FIG. 5, the electronic device to which the slot antenna is applied is a notebook computer 50. A keyboard area 52, a touch area 54, and a palm rest (as shown in FIG. 5, including a left palm rest 56 and a right palm rest 58) are disposed on a surface C of the notebook computer 50. A radiating slot is located in the palm rest of the notebook computer 50. For example, a body of the slot antenna is a metal housing part including the left palm rest 56 and the right palm rest 58 near the keyboard area 52 of the notebook computer 50. The left palm rest 56 and the right palm rest 58 include four radiating slots: a radiating slot 510, a radiating slot 520, a radiating slot 530, and a radiating slot 540. Each radiating slot and a nearby metal body may be considered to form a slot antenna. Each radiating slot includes a pair of a feeding point and a grounding point. The radiating slot 510 has a grounding point 512 and a feeding point 514. The radiating slot 520 has a grounding point 522 and a feeding point 524. The radiating slot 530 has a grounding point 532 and a feeding point 534. The radiating slot 540 has a grounding point 542 and a feeding point 544.

It should be understood that a quantity of radiating slots in the palm rest in FIG. 5 is merely an example. In another embodiment, the palm rest may include only one radiating slot, for example, include only any one of the radiating slot 510, the radiating slot 520, the radiating slot 530, and the radiating slot 540. In still another embodiment, the palm rest may include two radiating slots, for example, include the radiating slot 510 and the radiating slot 520, or include the radiating slot 510 and the radiating slot 530, or include the radiating slot 520 and the radiating slot 540, or the like.

It should be further understood that shapes of radiating slots in FIG. 5 are merely examples. In different embodiments, radiating slots of different shapes may be selected based on a requirement of an operating frequency band of a product and/or a layout of metal components in the product, and the like. For example, the straight-line shaped radiating slot shown in FIG. 5, and an L-shaped radiating slot shown in FIG. 6. This is not enumerated one by one in this application. When there are a plurality of radiating slots in the palm rest, any two radiating slots may have a same shape, or may have different shapes. This is not limited in the embodiments of this application.

It should be further understood that sizes of radiating slots in FIG. 5 are merely examples. In different embodiments, a length and a width of a radiating slot may be set based on a requirement of an operating frequency band of the product and/or a material shape of the product. When there are a plurality of radiating slots in the palm rest, any two radiating slots may have a same length and/or width, or may have different lengths and/or widths. This is not limited in the embodiments of this application.

It should be further understood that positions of the grounding point and the feeding point in each radiating slot in FIG. 5 are merely examples. In different embodiments, a grounding point and a feeding point may be disposed at an appropriate position selected from a radiating slot based on a requirement of an operating frequency band of a product. When there are a plurality of radiating slots in the palm rest, relative positions of grounding points and feeding points in the radiating slots may be the same or may be different. This is not limited in the embodiments of this application.

Figure 6:
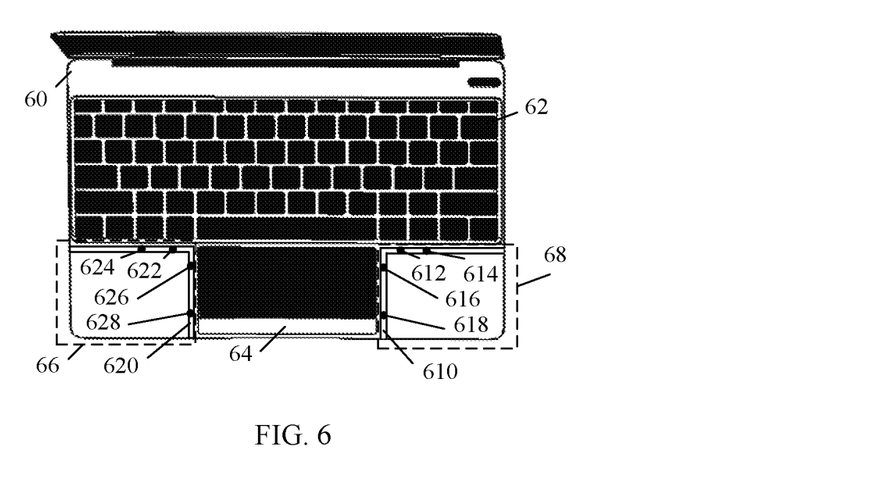
FIG. 6 is a schematic structural diagram of an electronic device and a slot antenna according to another embodiment of this application.

FIG. 6 is a schematic structural diagram of an electronic device 60 and a slot antenna according to another embodiment of this application. A keyboard area 62, a touch area 64, and a palm rest (as shown in FIG. 6, including a left palm rest 66 and a right palm rest 68) are disposed on a surface C of the electronic device 60 shown in FIG. 6. Radiating slots in the left palm rest 66 and the right palm rest 68 are L-shaped slots. In this embodiment of this application, an L-shaped radiating slot may be disposed in only one palm rest, or an L-shaped radiating slot may be separately disposed in a left palm rest and a right palm rest, and one or more L-shaped radiating slots may be disposed in each palm rest. The L-shaped radiating slot is separately disposed in the left palm rest 66 and the right palm rest 68 of the electronic device 60 shown in FIG. 6: an L-shaped radiating slot 610 and an L-shaped radiating slot 620. The L-shaped radiating slot is easily arranged in a housing of the electronic device, and a formed operating frequency band of the slot antenna is wide.

A first part of the L-shaped radiating slot 610 has a first feeding point 614 and a first grounding point 612, the first grounding point 612 is closer to a first end (an end close to a touchpad) of the first part (a part close to and parallel to a long side of the keyboard area) than the first feeding point 614, and the first grounding point 612 is farther from a second end (an end close to an edge of the housing) of the first part than the first feeding point 614. A second part (a part parallel to and close to the touchpad) of the L-shaped radiating slot 610 has a second feeding point 618 and a second grounding point 616, the second grounding point 616 is closer to a third end (an end close to the keyboard area) of the second part than the second feeding point 618, the second grounding point 616 is farther from a fourth end (an end close to an edge of the housing) of the second part than the second feeding point 618, and the first end coincides with the third end.

A third part of the L-shaped radiating slot 620 has a third feeding point 624 and a third grounding point 622, the third grounding point 622 is closer to a fifth end (an end close to the touchpad) of the third part (a part close to and parallel to the long side of the keyboard area) than the third feeding point 624, and the third grounding point 622 is farther from a sixth end (an end close to the edge of the housing) of the third part than the third feeding point 624. A fourth part (a part parallel to and close to the touchpad) of the L-shaped radiating slot 620 has a fourth feeding point 628 and a fourth grounding point 626, the fourth grounding point 626 is closer to a seventh end (an end close to the keyboard area) of the fourth part than the fourth feeding point 628, the fourth grounding point 626 is farther from an eighth end (an end close to the edge of the housing) of the fourth part than the fourth feeding point 628, and the fifth end coincides with the seventh end.

As shown in FIG. 6, the first part of the L-shaped radiating slot 610 is parallel and close to the long side of the keyboard area, and the second part of the L-shaped radiating slot 610 is perpendicular to the first part and parallel and close to a side of the touch area. Two parts of the L-shaped radiating slot 620 are also disposed similar to the L-shaped radiating slot 610. The L-shaped radiating slot is disposed in the palm rest in this possible implementation, and does not affect a layout of other components of the electronic device. This ensures performance of the slot antenna.

In another embodiment of this application, the L-shaped radiating slot may be disposed in the palm rest in a form shown in FIG. 6, or may be disposed in the palm rest in another form. For example, an included angle of the L-shaped radiating slot may be distributed near the other three corners or any position of the palm rest other than the palm rest in FIG. 6. When the palm rest includes a plurality of L-shaped radiating slots, distribution of the L-shaped radiating slots in the palm rest may be symmetric or asymmetric. This is not limited in the embodiments of this application.

Figure 7:
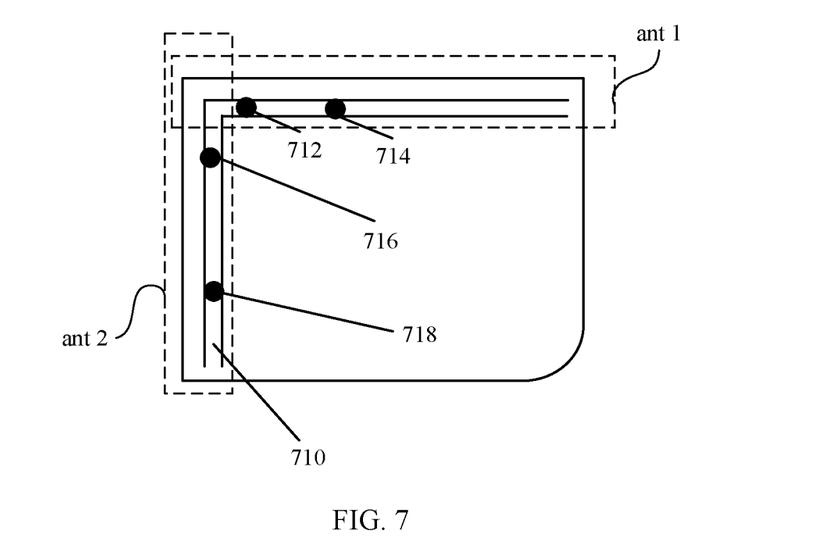
FIG. 7 is a schematic diagram of an L-shaped radiating slot according to an embodiment of this application.

Optionally, the L-shaped radiating slot may implement a low-frequency function and a high-frequency function. FIG. 7 is a schematic diagram of an L-shaped radiating slot 710 according to an embodiment of this application. As shown in FIG. 7, a length of a first part of the L-shaped radiating slot 710 and a length of a second part of the L-shaped radiating slot 710 are greater than 50 millimeters. The first part of the L-shaped radiating slot and metal around the slot may form a first sub-antenna ant 1, and a distance between a first feeding point 714 on the ant 1 and a second end of the first part is greater than 35 millimeters. In other words, a distance between a first grounding point 712 and the first feeding point 714 on the ant 1 is relatively small, and the first feeding point 714 is far away from an edge of a housing. Therefore, the ant 1 may be considered as a low-frequency sub-antenna. The second part of the L-shaped radiating slot and metal around the slot may form a second sub-antenna ant 2, and a distance between a second feeding point 718 on the ant 2 and a fourth end of the second part is greater than or equal to 10 millimeters and less than or equal to 30 millimeters. In other words, a distance between a second grounding point 716 and the second feeding point 718 on the ant 2 is relatively large, and the second feeding point 718 is close to the edge of the housing. Therefore, the ant 2 may be considered as a high-frequency sub-antenna. It should be understood that the first sub-antenna ant 1 and the second sub-antenna ant 2 may be interchanged as a whole. It should be understood that, in another embodiment of this application, the first feeding point 714 and/or the second feeding point 718 may be disposed at a position other than the foregoing range, to adapt to various frequency band requirements. This is not limited in the embodiments of this application.

Figure 8:
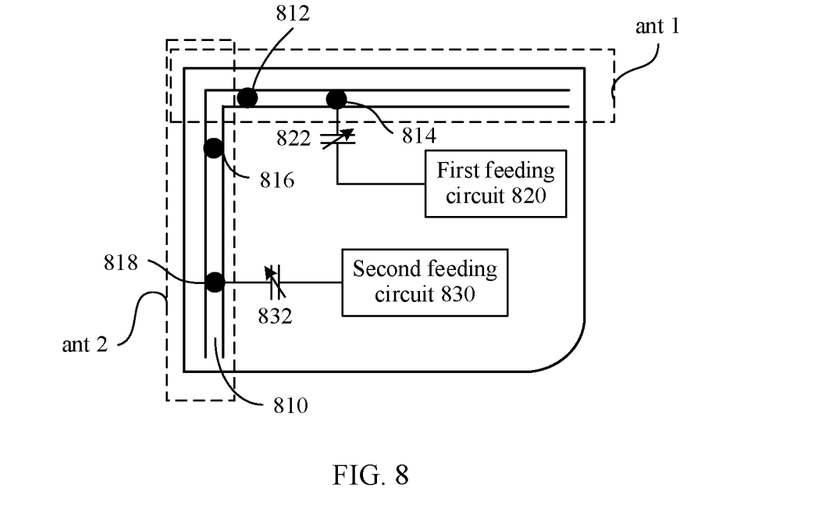
FIG. 8 is a schematic diagram of an L-shaped radiating slot according to another embodiment of this application.

Optionally, in an embodiment provided in this application, a first feeding point may be connected to a first feeding circuit by using a first tunable capacitor. FIG. 8 is a schematic diagram of an L-shaped radiating slot 810 according to another embodiment of this application. As shown in FIG. 8, a first tunable capacitor 822 may be connected in series between a first feeding point 814 and a first feeding circuit 820, and a capacitance value of the first tunable capacitor 822 is tunable within a range from 0 to a specific value. In this way, an equivalent length between a first grounding point 812 and the first feeding point 814 may be tuned by using the first tunable capacitor 822, to implement that a frequency band of a first sub-antenna ant 1 is tunable.

Optionally, in an embodiment provided in this application, a second feeding point may be connected to a second feeding circuit by using a second adjustable capacitor component. As shown in FIG. 8, a second tunable capacitor 832 may be connected in series between a second feeding point 818 and a second feeding circuit 830, and a capacitance value of the second tunable capacitor 832 is tunable within a range from 0 to a specific value. In this way, an equivalent length between a second grounding point 816 and the second feeding point 818 may be tuned by using the second tunable capacitor 832, to implement that a frequency band of a second sub-antenna ant 2 is tunable. It should be understood that the first tunable capacitor 822 is connected in series between the first feeding point 814 and the first feeding circuit 820, and the second tunable capacitor 832 is connected in series between the second feeding point 818 and the second feeding circuit 830 are both optional. This is not limited in the embodiments of this application.

Figure 9:
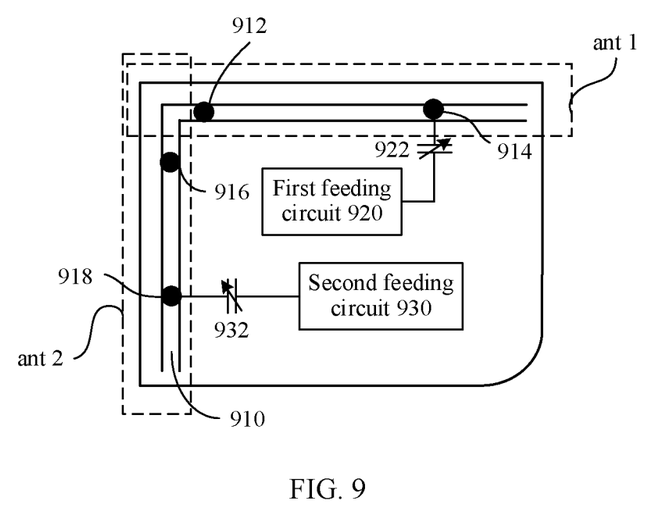
FIG. 9 is a schematic diagram of an L-shaped radiating slot according to still another embodiment of this application.

According to the foregoing similar principles, this application may provide a full-band slot antenna. FIG. 9 is a schematic diagram of an L-shaped radiating slot 910 according to still another embodiment of this application. Optionally, in an embodiment provided in this application, a first feeding point 914 may be disposed at a position that is relatively close to an edge of a housing (for example, a distance between the first feeding point 914 and the edge of the housing is greater than or equal to 10 millimeters and less than or equal to 15 millimeters), to implement a high-frequency band of a first sub-antenna ant 1. A first tunable capacitor 922 may be connected in series between the first feeding point 914 and a first feeding circuit 920, or a first fixed capacitor may be connected in series between the first feeding point 914 and the first feeding circuit 920 under control of a switch. An equivalent length between a first grounding point 912 and the first feeding point 914 is tuned by using the first tunable capacitor 922 or the first fixed capacitor, to implement a low-frequency band of the first sub-antenna ant 1.

Optionally, in an embodiment provided in this application, a second feeding point 918 may be disposed at a position that is relatively close to an edge of a housing (for example, a distance between the second feeding point 918 and the edge of the housing is greater than or equal to 10 millimeters and less than or equal to 15 millimeters), to implement a high-frequency band of a second sub-antenna ant 2. A second tunable capacitor 932 may be connected in series between the second feeding point 918 and a second feeding circuit 930, or a second fixed capacitor may be connected in series between the second feeding point 918 and the second feeding circuit 930 under control of a switch. An equivalent length between a second grounding point 916 and the second feeding point 918 is tuned by using the second tunable capacitor 932 or the second fixed capacitor, to implement a low-frequency band of the second sub-antenna ant 2.

It should be understood that the ant 1 may be a full-band antenna, and the ant 2 may also be a full-band antenna. An L-shaped radiating slot can implement a 2×2 full-band antenna. Two L-shaped radiating slots can implement a 4×4 full-band antenna.

Figure 10:
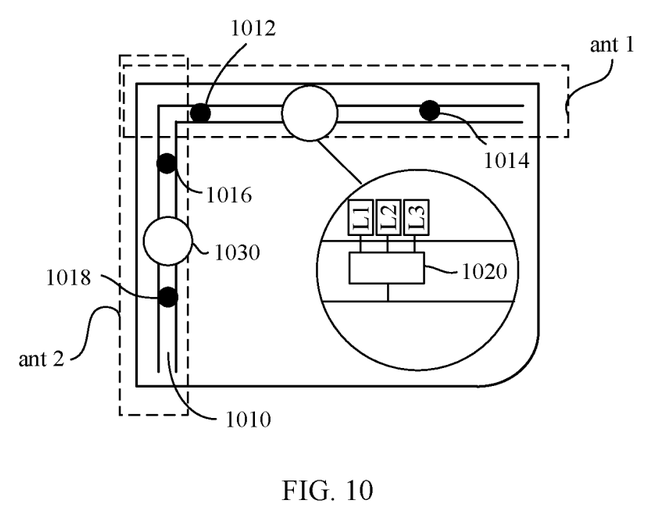
FIG. 10 is a schematic diagram of an L-shaped radiating slot according to yet another embodiment of this application.

A low-frequency band state tuned by a capacitor connected in series at a feeding point usually has a relatively small bandwidth. This application provides another embodiment, which may cover a full-band and a low-band. FIG. 10 is a schematic diagram of an L-shaped radiating slot 1010 according to yet another embodiment of this application. Optionally, in an embodiment provided in this application, as shown in FIG. 10, a first part of the L-shaped radiating slot 1010, a first grounding point 1012 on the first part, and a first feeding point 1014 on the first part may form a first sub-antenna ant 1. There is a first frequency band adjustment point between the first grounding point and the first feeding point, a first selection component is disposed at the first frequency band adjustment point, and the first selection component is configured to select inductance components with different inductance values to connect to metal on two sides of a slot at the first frequency band adjustment point. Specifically, an appropriate position between the first grounding point 1012 and the first feeding point 1014 may be selected to connect to the first selection component (for example, a first switch 1020 in FIG. 10) that is across the slot. By using the first switch 1020, one of different inductors L1, L2, L3, . . . may be selected, to implement wide-band coverage of a low-frequency band of the first sub-antenna ant 1. It should be understood that, when the L1 is connected, other inductors (L2, L3 . . . ) are in a non-connected state.

A second part of the L-shaped radiating slot 1010, a second grounding point 1016 on the second part, and a second feeding point 1018 on the second part may form a second sub-antenna ant 2. There is a second frequency band adjustment point between the second grounding point and the second feeding point, a second selection component is disposed at the second frequency band adjustment point, and the second selection component is configured to select inductance components with different inductance values to connect to metal on two sides of a slot at the second frequency band adjustment point. Specifically, an appropriate position between the second grounding point 1016 and the second feeding point 1018 may be selected to connect to the second selection component (for example, a second switch 1030) that is across the slot. Similarly, one inductor may be selected from different inductors by using the second switch 1030, to implement wide-band coverage of a low-frequency band of the second sub-antenna ant 2. Details are not described herein again.

In the electronic device in the embodiments of this application, the slot antenna may be disposed in the surface C, and the L-shaped radiating slot is disposed at a palm rest position, to implement full-band antenna coverage, and resolve problems of a full-screen, a metallic body, and isolation between multi-antenna systems.

Figure 11:
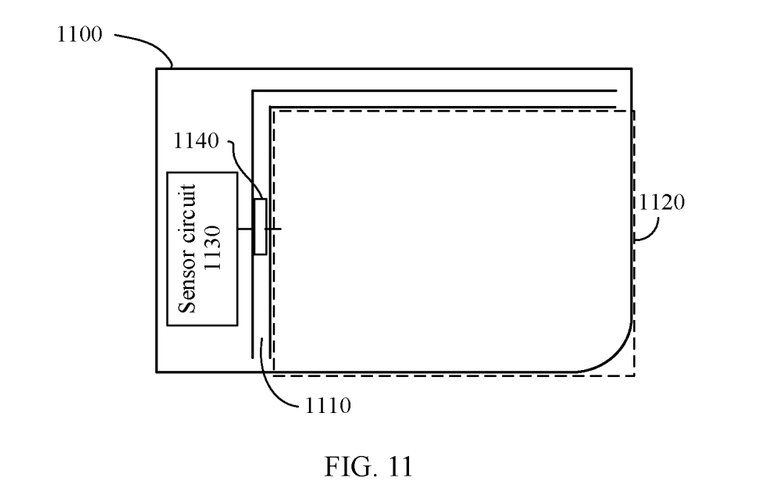
FIG. 11 is a schematic diagram of a partial structure of an electronic device according to an embodiment of this application.

In an embodiment of this application, the electronic device may include a specific absorption rate (Specific Absorption Rate, SAR) sensor (sensor). The SAR sensor includes a sensor body and a sensor circuit. A working principle of the SAR sensor requires that the sensor body cannot be grounded and the sensor circuit works in an approximate direct-current state. FIG. 11 is a schematic diagram of a partial structure of an electronic device 1100 according to an embodiment of this application. In this embodiment of this application, the electronic device 1100 includes an antenna and an SAR sensor. FIG. 11 shows a metal radiator of the antenna and an L-shaped radiating slot 1110 in the metal radiator. At least a part of a metal body of a palm rest may be used as a sensor body of the SAR sensor (also a metal radiator of a slot antenna). For example, a part 1120 in a dashed-line box shown in FIG. 11 may be used as the sensor body of the SAR sensor. A sensor circuit 1130 of the SAR sensor may be connected to a sensor body 1120 by connecting in series an inductor 1140 with a relatively large inductance value (a feature of the inductor 1140 is that a direct-current is turned on and a high-frequency is turned off). An access point at which the sensor circuit 1130 is connected to the sensor body 1120 is not limited, and the sensor circuit 1130 may be connected to the sensor body 1120 at any position of the L-shaped radiating slot 1110. For ease of design, in this embodiment of this application, the sensor body of the SAR sensor may be connected to the sensor circuit by using at least one of a first feeding point, a first grounding point, a second feeding point, and a second grounding point (not shown in FIG. 11). To ensure that the sensor body is not grounded, in this embodiment of this application, the first grounding point of the L-shaped radiating slot is grounded by using a first capacitor, and the second grounding point is grounded by using a second capacitor. According to the design of this embodiment of this application, the SAR sensor and the antenna do not affect each other, and can work normally and efficiently.

Optionally, in an embodiment of this application, an area that is on a surface D of the electronic device and that is opposite to a radiating slot has a window, or the area that is on the surface D of the electronic device and that is opposite to the radiating slot is nonmetallic. This can ensure performance of the slot antenna.

Optionally, a metal component may be arranged in a part covered by a palm rest of the electronic device in this embodiment of this application, and a flat cable of the metal component is connected to a host system by using space between the first grounding point and the second grounding point.

Optionally, in the electronic device in this embodiment of this application, the palm rest includes a left palm rest and a right palm rest, and a slot antenna is separately formed in the left palm rest and the right palm rest. The electronic device further includes a sensor, and the sensor is configured to detect whether a palm of a user approaches the left palm rest or the right palm rest. When the palm of the user approaches only one of the left palm rest and the right palm rest, the electronic device disables operating of a slot antenna in a palm rest that the palm of the user approaches, and keeps operating of a slot antenna in a palm rest that the palm of the user does not approach.

Figure 12:
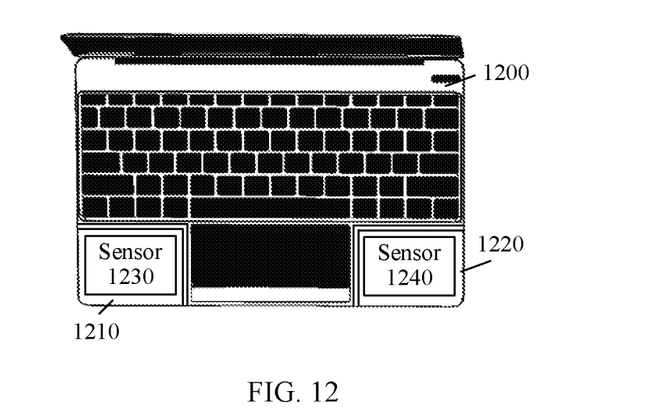
FIG. 12 is a schematic structural diagram of an electronic device according to another embodiment of this application.

FIG. 12 is a schematic structural diagram of an electronic device 1200 according to another embodiment of this application. As shown in FIG. 12, in the electronic device 1200 in this embodiment of this application, a palm rest includes a left palm rest 1210 and a right palm rest 1220, and a slot antenna is separately formed in the left palm rest 1210 and the right palm rest 1220. The electronic device 1200 further includes a sensor 1230 and a sensor 1240, the sensor 1230 is configured to detect whether a palm of a user approaches the left palm rest 1210, and the sensor 1240 is configured to detect whether the palm of the user approaches the right palm rest 1220. When it is detected that the palm of the user approaches only one of the left palm rest 1210 and the right palm rest 1220, the electronic device 1200 disables operating of a slot antenna in a palm rest that the palm of the user approaches, and keeps operating of a slot antenna in a palm rest that the palm of the user does not approach. This reduces power consumption of the electronic device.

It should be understood that division of a circuit, a sub-circuit, and a sub-unit in the embodiments of this application is merely an example. A person of ordinary skill in the art may be aware that circuits, sub-circuits, and sub-units in the examples described in the embodiments disclosed in this specification can be further divided or combined.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (Digital Video Disc, DVD), a semiconductor medium (for example, a solid state drive (Solid State Disk, SSD)), or the like.

It should be understood that "an embodiment" or "an embodiment" mentioned in the whole specification does not mean that particular features, structures, or characteristics related to the embodiment are included in at least one embodiment of this application. Therefore, "in an embodiment" or "in an embodiment" appearing throughout the specification does not refer to a same embodiment. In addition, these particular features, structures, or characteristics may be combined in one or more embodiments by using any appropriate manner.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It should be understood that in the embodiments of this application, "B corresponding to A" indicates that B is associated with A, and B may be determined based on A. However, it should further be understood that determining A based on B does not mean that B is determined based on A only. In other words, B may also be determined based on A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device comprising: a surface C comprising: a keyboard area for inputting first information using a keyboard; a touch area for inputting second information using a touchpad; a palm rest made of a metal material; and a radiating slot disposed in the palm rest to form a slot antenna, wherein the radiating slot is an L-shaped radiating slot, wherein the radiating slot comprises: a first feeding point; a first grounding point; a first part comprising: a first end; a second end; the first feeding point; and the first grounding point, wherein the first grounding point is closer to the first end than the first feeding point, and wherein the first grounding point is farther from the second end than the first feeding point; and a second part comprising: a third end coinciding with the first end; a fourth end; a second feeding point; and a second grounding point, wherein the second grounding point is closer to the third end than the second feeding point, and wherein the second grounding point is farther from the fourth end than the second feeding point.

2. The electronic device of claim 1, wherein the first part is parallel to and proximate to a long side of the keyboard area, and wherein the second part is perpendicular to the first part and parallel to and proximate to a side of the touch area.

3. The electronic device of claim 1, wherein a length of the first part and a length of the second part are greater than 50 millimeters (mm).

4. The electronic device of claim 1, wherein a distance between the first feeding point and the second end is greater than 35 millimeters (mm).

5. The electronic device of claim 1, wherein a distance between the second feeding point and the fourth end is greater than or equal to 10 millimeters (mm) and less than or equal to 30 mm.

6. The electronic device of claim 1, further comprising: a first capacitor configured to ground the first grounding point; and a second capacitor configured to ground the second grounding point.

7. The electronic device of claim 6, further comprising a specific absorption rate (SAR) sensor, wherein a sensor body of the SAR sensor is a part of a metal body of the palm rest.

8. The electronic device of claim 7, further comprising a sensor circuit coupled to the sensor body using at least one of the first feeding point, the first grounding point, the second feeding point, or the second grounding point.

9. The electronic device of claim 1, further comprising a metal component arranged in a part covered by the palm rest, wherein a flat cable of the metal component is coupled to a host system using a space between the first grounding point and the second grounding point.

10. The electronic device of claim 1, further comprising a first feeding circuit coupled to the first feeding point using a first tunable capacitor.

11. The electronic device of claim 1, further comprising a second feeding circuit coupled to the second feeding point using a second tunable capacitor.

12. The electronic device of claim 1, further comprising a first frequency band adjustment point located between the first grounding point and the first feeding point, wherein the first frequency band adjustment point comprises a slot with metal on two sides, and a first selection component configured to select inductance components with different inductance values to couple to the metal on the two sides of the slot.

13. The electronic device of claim 1, further comprising a second frequency band adjustment point located between the second grounding point and the second feeding point, wherein the second frequency band adjustment point comprises a slot with metal on two sides, and a second selection component configured to select inductance components with different inductance values to couple to the metal on the two sides of the slot.

14. The electronic device of claim 1, further comprising a surface D, wherein the surface D comprises an area opposite to the radiating slot, and wherein the area is nonmetallic or comprises a window.

15. The electronic device of claim 1, wherein the palm rest comprises one or more areas on the surface C except the keyboard area and the touch area.

16. The electronic device of claim 1, wherein the palm rest comprises a left palm rest and a right palm rest, wherein the slot antenna is separately formed in the left palm rest and the right palm rest, wherein the electronic device further comprises a sensor configured to detect whether a palm of a user approaches the left palm rest or the right palm rest, and wherein when the palm of the user approaches one of the left palm rest or the right palm rest, the electronic device is configured to:
  disable operation of a second slot antenna in a second palm rest that the palm of the user approaches; and
  keep operation of a third slot antenna in a third palm rest that the palm of the user does not approach.

17. The electronic device of claim 1, further comprising:
  a surface A configured to be a top cover;
  a surface B comprising a screen; and
  a surface D configured to be a bottom cover.

18. The electronic device of claim 1, wherein the slot antenna is a mobile communication antenna.

* * * * *